July 4, 1950     F. C. HALLDEN     2,514,054
COMPARING MECHANISM
Filed May 6, 1948     3 Sheets-Sheet 1

INVENTOR
FRED C. HALLDEN
BY John B. Sprowls
AGENT

July 4, 1950 F. C. HALLDEN 2,514,054
COMPARING MECHANISM
Filed May 6, 1948 3 Sheets-Sheet 3

INVENTOR
FRED C. HALLDEN
BY John B Sponsler
AGENT

Patented July 4, 1950

2,514,054

UNITED STATES PATENT OFFICE 2,514,054

COMPARING MECHANISM

Fred C. Hallden, Brooklyn, N. Y., assignor to International Business Machines Corporation, New York, N. Y., a corporation of New York Application May 6, 1948, Serial No. 25,500

8 Claims. (Cl. 235—61.7)

1

This invention relates to apparatus for storing and comparing electrical impulses by the medium of small fixed capacitors.

More particularly the present invention is directed to electromechanical devices for the storage and comparison of record card data in an electrical accounting machine of the type illustrated in U. S. Patent 2,359,670. The features of this invention, however, are not limited to electrical accounting machines, but may be applied to any electrical apparatus wherein the storing, comparing, and selecting of electrical impulses are required.

Briefly the subject invention comprises a rotating element containing a plurality of pairs of small fixed capacitors arranged to be charged and discharged by means of contact brushes and contact segments to which the capacitors are connected. In the embodiment chosen the element is rotated in timed sequence with the feeding of a record card having perforations which pass under electrical sensing stations as the card is fed. Electrical circuits are provided from the sensing stations to energize gas triodes, which become conductive, providing a potential drop for charging selected capacitors in the rotating element by suitable connections to the contact brushes. Thereafter the charges on the capacitors are delivered to electronic comparing circuits through other contact brushes associated with the rotating elements. Provision is also made by means of another set of contact brushes coacting with the rotating element to recharge a capacitor regeneratively; for example, when a gas triode is not energized by a sensing station, the energization being provided by sensing the charge remaining on the capacitor which is to be regenerated. Regeneration of a charge in this manner may be produced periodically for an indefinite length of time to effect a perpetual type of impulse storage in a fixed capacitor having normal leakage resistance.

The principal object of this invention is therefore to provide a perpetual capacitor storage device for electrical charges.

Another object of this invention is to provide a novel electronic comparing circuit energized from electrical potentials derived from charges stored in small fixed capacitors.

Still another object of the invention is to provide a condenser charging and discharging device wherein charges upon small capacitors are utilized to control gas triodes to regeneratively charge the capacitors.

A further object of the invention is to provide a novel electromechanical storage unit.

Other objects of the invention will be pointed out in the following description and claims and illustrated in the accompanying drawings, which disclose, by way of example, the principle of the invention and the best mode, which has been contemplated, of applying that principle.

In the drawings:

Fig. 8 is a circuit diagram illustrating the present invention as it might be embodied in a machine of the type described in U. S. Patent 2,359,670.

Fig. 9 is a timing chart relative to the circuit diagram of Fig. 8.

Figure 1:
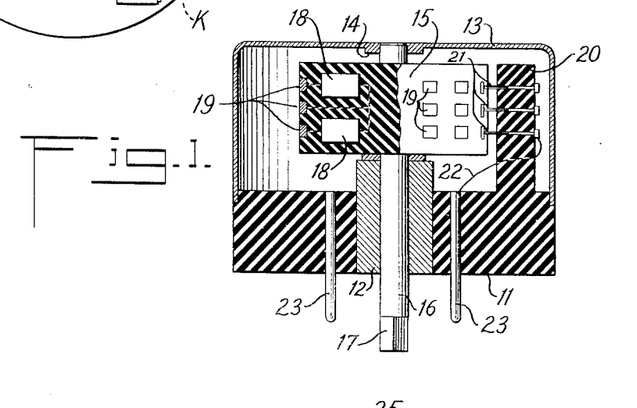
Fig. 1 is a sectional view of a capacitor electrical storage unit.

Referring now to Fig. 1, a cylindrical base 11 composed of insulating material, contains a central bearing 12, the base being surmounted by a cup 13 having a bearing 14. A cylinder 15 of insulating material is fixed to a shaft 16 supported freely by the bearings 12 and 14 and having a driving end 17. Within the cylinder 15 are contained a plurality of small fixed condensers 18, there being a total of twenty such capacitors uniformly distributed in pairs throughout the cylinder 15. Each pair of condensers 18 is connected in series with their connections being led to contact segments 19 imbedded and spaced uniformly in the lateral surface of the cylinder 15 in groups of threes. The outer segments 19 each connect with a condenser 18 of a pair having a common connection to the center segment 19 of the group.

Figure 3:
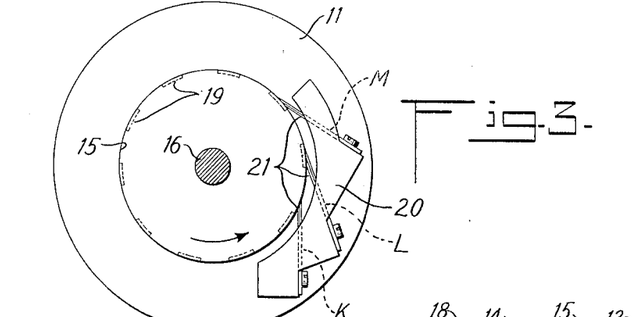
Fig. 3 is a diagrammatic view of the storage unit of Fig. 1 showing the various sets of contact brushes.

A brush holder 20 forms a raised part upon the base 11 and carries three (3) sets of contact brushes 21 which ride upon the surface of the cylinder 15 making contact with their respective segments 19 as the cylinder 15 is rotated. With reference also to Fig. 3, for purposes of clarity these sets of brushes are defined as set K having three (3) brushes, set L having three (3) brushes, and set M having two (2) brushes, the brush normally contacting the center segment 19 being omitted in set M. Each brush is connected by a wire such as 22 to a contact pin 23 projecting through the base 11, there being a total of eight (8) such pins corresponding to an equal number of brushes 21.

Figure 2:
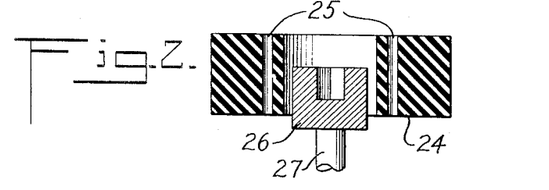
Fig. 2 is a sectional view of a socket and drive into which the storage unit of Fig. 1 is plugged.

The unit shown in Fig. 1 is pluggable into a socket as shown in Fig. 2, the socket comprising an insulated receptacle 24 having eight (8) pin sockets 25 for connecting with the pins 23. The receptacle 24 also has a keyed socket 26 connected to a drive shaft 27 which may be driven through any conventional means. The socket 26 engages with the end 17 of the shaft 16, thereby affording a means to rotate the cylinder 15.

Figure 4:
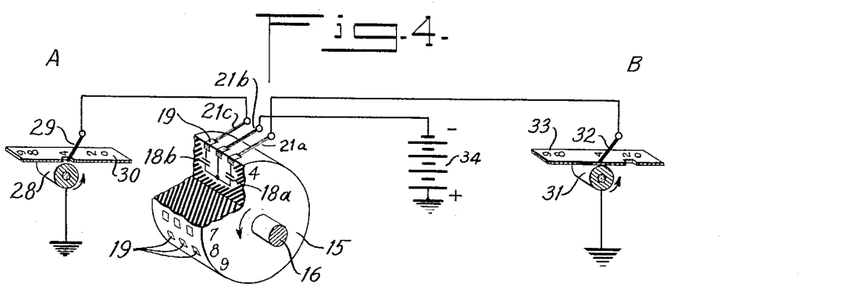
Fig. 4 is a fragmentary circuit diagram and diagrammatic view of a storage unit illustrating the principle by which the fixed capacitors may be charged from data sensed in perforated record cards.

Now referring to Fig. 4, an electric circuit is shown wherein the condensers 18 in a storage unit similar to that of Fig. 1 are charged by voltage impulses derived from conventional card sensing stations. A sensing station A, comprising a contact roll 28 and a sensing brush 29, connected as shown, is arranged to have a record card 30 fed to it so that a perforation representing certain data may be sensed in a manner well known in electrical accounting machines. A similar sensing station B, comprising a contact roll 31 and a sensing brush 32, connected as shown, is arranged to sense a record card 33. The cards 30 and 33 are fed in synchronism with the rotation of the cylinder 15 so that correspondingly indexed positions in the cards coincide with positions of the cylinder 15. Let it be assumed that a perforation occurs at the "4" index position of card 30 and a perforation occurs at the "2" index position of card 33. When the "4" perforation in card 30 is sensed at sensing station A a circuit is completed from a battery 34 to the central brush 21b, through a segment 19, to the common connection of the pair of condensers 18 (corresponding to the "4" position of cylinder 15), through the condenser 18b (left side of cylinder 15, see Fig. 4) to a segment 19 (left side), through a brush 21c (left side), to brush 29, contact roll 28, to grounded side of battery 34, thereby charging the condenser 18b (left side). When the "2" perforation in card 33 is sensed at station B a similar circuit is completed via brush 32 and brush 21a to charge a condenser 18a (right side of cylinder 15, see Fig. 4). Any condenser 18 in the cylinder 15 may be charged in the manner described, the charge normally remaining thereon for a time dependent upon its leakage resistance.

Figure 5:
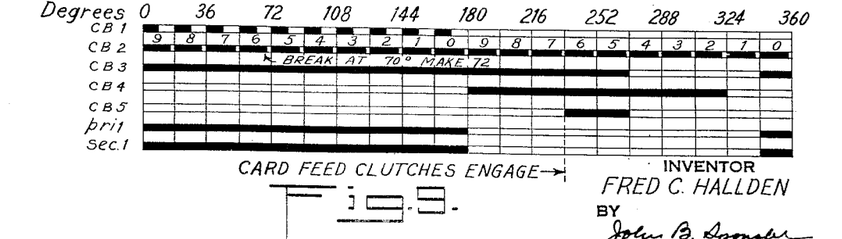
Fig. 5 is a fragmentary circuit diagram and a diagrammatic view of a storage unit illustrating the manner in which the fixed capacitors are charged (and regeneratively recharged) in the present invention.

In the present invention it has been found to be more practicable to charge the condensers 18 by means of a circuit illustrated in Fig. 5, certain advantages being obtained thereby. Let the brushes 21a, 21b, and 21c represent the set of brushes L (Fig. 3), the brushes 21g and 21h represent the set M (Fig. 3), and the brushes 21r, 21s, and 21t represent the set of brushes K (Fig. 3). A plug hub P—1 is plugged to the sensing brush (e. g. the brush 32 of Fig. 4) of a conventional record card sensing station such as B of Fig. 4 so that a positive voltage impulse is delivered to P—1 when a perforation in a record card is sensed. When charging a condenser 18 (as in preceding paragraph) a switch S—1 is thrown to its top contact so that a positive voltage pulse is delivered to the grid of a gas triode G—1 when a perforation occurs in the card. The triode G—1 is connected across a direct current source having a positive line W—1 and a negative line W—2; consequently, G—1 becomes conductive and current flows through a resistor R—1 provided that a circuit breaker CB—0 is closed. A voltage drop is thereby developed by the resistor R—1 which is provided by connections (as shown in Fig. 5) across the brushes 21a and 21b to corresponding segments 19 of the cylinder 15 as it turns on shaft 16 to charge a condenser (e. g. a condenser 18 of Fig. 4) having its terminals connected to the corresponding segments 19.

Normally the circuit breaker CB—0 is closed for a period from the time a group of segments 19 passes under the set of brushes K (see Fig. 3 also) until the same group of segments passes out from under the set of brushes L. The brush sets K and L, accordingly, are spaced to have the distance between their respective points of contact with cylinder 15 less than the distance between two adjacent groups of segments 19 on the cylinder 15. While switch S—1 remains on its upper contact, if no positive voltage impulse is received at the plug hub P—1, the gas triode G—1 remains non-conductive, and, as the cylinder 15 rotates, the segments 19 pass under the brushes 21a and 21b thereby discharging each charged condenser 18 through the resistance R—1.

The polarity of the voltage (derived from the drop across R—1) providing the charging current for a condenser 18 is such that a segment 19 passing under brush 21a is positive and a segment 19 passing under brush 21b is negative. When the switch S—1 is thrown to its lower contact, as the cylinder 15 rotates, any charged condenser 18 having its terminals connected to corresponding segments 19 is sensed by the brushes 21r and 21s, and a potential is thereby provided across the grid-cathode circuit of the triode G—1, rendering G—1 conductive provided the potential is sufficient in magnitude. Consequently when a charged condenser 18 passes under the brushes 21r and 21s in this manner, G—1 conducts and remains conductive until CB—0 opens the circuit. Hence a voltage drop is set up across resistor R—1 until the segments 19 connected to the condenser 18 pass under the brushes 21a and 21b at which time the voltage drop is applied across the condenser 18 to recharge it. In the manner just described the charge upon any condenser 18 may be regenerated again and again as the cylinder 15 rotates to provide a voltage impulse storage means of indefinite duration.

Figure 6:
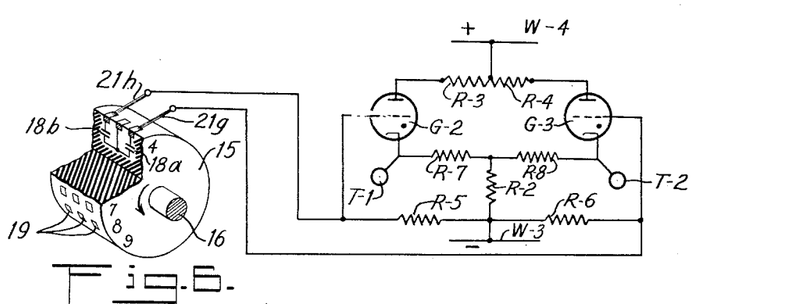
Fig. 6 shows a fragmentary electrical circuit adapted to comparing charges upon a pair of capacitors in the storage unit.

Referring now to Fig. 6, it is obvious that circuits and energizing means suitable for charging both the condenser 18a and the condenser 18b can be provided as previously explained. The brushes 21g and 21h (brush set M of Figs. 3 and 5) are spaced from the brush set L a distance equivalent to the distance between two adjacent groups of segments 19 of the cylinder 15 so that after the condensers 18a and 18b are charged they are presented one cycle point later to the brushes 21g and 21h as the cylinder 15 is rotated. The circuit shown in Fig. 6 enables the status of charges upon the condensers to be determined. A pair of gas triodes G—2 and G—3 are connected with their cathodes in common through a resistor R—2 to a conductor W—3 representing the negative side of a direct current source. The anodes of the gas triodes G—2 and G—3 are connected respectively through a pair of resistors R—3 and R—4 to a conductor W—4 representing the positive side of the direct current source. The grid of G—2 is connected to brush 21h and the grid of G—3 is connected to brush 21g, there being also connections from the grids respectively through the resistors R—5 and R—6 to the conductor W—3.

Let it be assumed that condenser 18a alone is charged. When segments 19 contact the brushes 21g and 21h the condenser 18a will discharge causing a current to flow via brush 21g, resistor R—6, resistor R—5, brush 21h, and condenser 18b. A voltage drop will be set up in resistor R—6 raising the potential of the grid of G—3 and in resistor R—5 lowering the potential of the grid of G—2, each with respect to its cathode. The triode G—3 therefore becomes conductive and a current flows from W—4, through R—4, anode and cathode of G—3, R—8, R—2, to W—3. The voltage drop produced in R—2 thereby provides a negative bias to the grid of G—2 via the resistors R—5 and R—7, sufficiently greater than the positive potential derived from condenser 18b in the event that such potential is applied while G—3 is conducting to retain G—2 non-conductive. A correlative condition prevails when the condenser 18b alone is charged.

When neither condenser 18a nor condenser 18b is charged it is obvious that no voltage drop is set up in either R—5 or R—6 to render either G—2 or G—3 conductive. Similarly when both condensers 18a and 18b are charged to the same potential there will be no difference in potential between brush 21g and brush 21h and no current will flow through R—5 and R—6 so no voltage drop is provided to render either G—2 or G—3 conductive. When G—2 becomes conductive the potential of a terminal T—1 rises, and when G—3 conducts the potential of a terminal T—2 rises; consequently, another electronics circuit may be controlled thereby to utilize the features of the circuit shown in Fig. 6.

Figure 7:
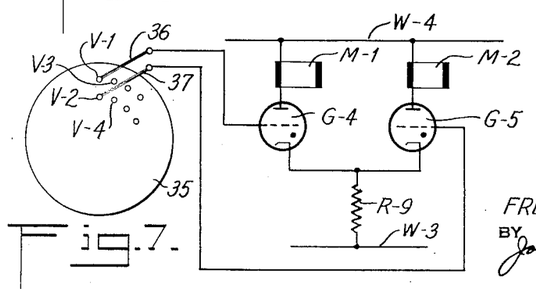
Fig. 7 is a fragmentary circuit diagram of a selector circuit utilized in the subject invention.

For purposes of illustration, let it be assumed that two storage units, each with an associated circuit as in Fig. 6, are employed, as for example in a record controlled machine where for control purposes the data read from one column of a record card is to be given preponderance over data read from another column. Fig. 7 illustrates a selector circuit utilized in the present invention wherein a selector disc 35 has a pair of brushes 36 and 37 sweeping respectively over contacts V—1, V—3 and V—2, V—4. Let it be assumed also that circuit connections are provided from T—1 (Fig. 6) to V—1, from T—2 (Fig. 6) to V—2, and similar connections from the second storage unit circuit mentioned above to V—3 and V—4. The brushes 36 and 37 are connected respectively to the grids of two gas triodes G—4 and G—5 having their cathodes connected in common through a resistor R—9 to the conductor W—3 and having their anodes connected respectively through the magnets M—1 and M—2 to the conductor W—4. The comparing circuit connected with contacts V—1 and V—2 will have preponderance for control over that connected with V—3 and V—4. Assume, as has been previously explained, that the potential of T—1 (Fig. 6) has risen so that V—1 is at a positive potential with respect to conductor W—3 and that V—2 is neutral while V—3 is neutral and V—4 is at a positive potential. When the brushes 36 and 37 encounter V—1 and V—2 respectively the gas triode G—4 will become conductive, current will flow from W—4, through M—1, G—4, and R—9 to the conductor W—3. A voltage drop will thereby be set up in R—9 to bias the grids of G—4 and G—5 so that neither will thereafter be capable of being rendered conductive by positive potentials derived by the brushes 36 and 37 as they sweep over the contacts V—3 and V—4 respectively. G—4 remains conductive, however, until its anode circuit is interrupted and the preponderance sought is accomplished. When energized the magnets M—1 may be used to control the operation of a record card machine in one manner and M—2 in an opposite manner, e. g. to feed primary cards or to feed secondary cards. When both V—1 and V—2 are neutral, indicating no desire therefrom for control, the preponderance for control is shifted to V—3 and V—4, either of which, if positive, will render G—4 or G—5 conductive. In this manner any number of positions may be selected for control preponderance merely by adding additional contacts upon the selector disc 35 and connecting these with additional storage units having comparing circuits as already explained.

Having now described the essential features of the invention, a complete embodiment is shown in the circuit diagram of Fig. 8 as applied to a record controlled of the type commonly referred to as a collator. Essentially in its simplest form the collator compares record cards of two classes; namely, primary cards and secondary cards, feeding record cards of one class ahead of cards of the other class in order of their corresponding data designations. Many other functions are performed by record controlled machines of this type, see for example U. S. Patents 2,359,670 and 2,379,828, but for purposes of illustrating the utility of the present invention it will suffice to explain the operation of the present invention only to the extent where a primary card may be said to be higher, lower, or equal in denomination as compared with a secondary card. In the embodiment illustrated (see Fig. 8) this distinction will be evinced by the controlling of certain contacts; namely, RL—3a and RL—4a (Fig. 8), to complete a circuit to one of the three terminals LS, LP, or EQ (Fig. 8), these corresponding, respectively, to the three connections shown leading from the contact strips 412 and 413 and the extreme right contact strip 416 of the "Secondary Comparing Unit" of Fig. 17a, U. S. Patent 2,359,670.

Referring now to Fig. 8, provision is made for comparing record cards wherein more than a single column of data in each card is compared at one time, there being two combined units shown, each comprising a storage unit, a regenerative capacitor charging circuit, and a comparing circuit. It is obvious that the capabilities of the present invention may be expanded by including as many of these combined units as are desired. Each combined unit includes a storage unit (partially shown in Fig. 8 by dotted lines) having a cylinder 15a or 15b provided with condensers 18 arranged in pairs, their terminals connected with the segments 19. Coacting with one of these storage units are three sets of brushes, the sensing brushes 38, 39, 40; and charging brushes 41, 42, 43; and the comparing brushes 44 and 45. The first two brush sets mentioned are connected with a pair of gas triodes G—6 and G—7 having as circuit components the resistors R—10, R—11, R—12, R—13, R—14 and R—15, the relay contacts RL—1a and RL—2a, and the plug hubs U—1 and U—2. The third set of brushes is connected with a pair of gas triodes G—10 and G—11 having as circuit components the resistors R—16, R—17, R—18, R—19, and R—20. Coacting with the other of the storage units are three sets of brushes, the sensing brushes 46, 47, 48; the charging brushes 49, 50, 51; and the comparing brushes 52 and 53. The first two sets of these brushes are connected with a pair of gas triodes G—8 and G—9 having as circuit components the resistors R—21, R—22, R—23, R—24, R—25 and R—26, the relay contacts RL—1b and RL—2b, and the plug hubs U—3 and U—4. The third set of brushes is connected with a pair of gas triodes G—12 and G—13 having as circuit components the resistors R—27, R—28, R—29, R—30, and R—31. The cathodes of G—11 and G—10 are connected, respectively, to a pair of inserts 60 and 61 on a selector disc SD, and the cathodes of G—13 are G—12 are connected, respectively, to a pair of inserts 62 and 63 on the selector disc SD. A pair of contact rings 56 and 57 are provided on the disc SD upon which a pair of sliding contact brushes 58 and 59, respectively, slide. These brushes make contact with the said inserts as they are revolved together upon their respective rings, the brush 58 operating to connect the inserts 60 and 62 to the ring 56 and the brush 59 to connect the inserts 61 and 63 to the ring 57. For each combined unit added, similar to that representing column #1 or column #2 of Fig. 8, an additional pair of inserts is added to the disc SD. The rings 56 and 57 are connected to a pair of gas triodes G—14 and G—15, respectively, which have circuit components comprising resistors R—32, R—33, R—34, R—35, and R—36, the biasing batteries EC—2 and EC—3, and the relay coils RL—3 and RL—4. A pair of conventional contact rolls CRP and CRS similar to PCR1 and SCR of Fig. 3b, U. S. Patent 2,359,670 are provided having respectively the common brushes 54 and 55 which are connected to the positive line W—4 of a direct current source through a circuit breaker CB—1. Another circuit breaker CB—2 connects the anodes of the gas triodes G—6, G—7, G—8, and G—9 with line W—4, and a circuit breaker CB—3 connects the anodes of gas triodes G—10, G—11, G—12 and G—13 with the positive line W—4. Gas triodes G—14 and G—15 have their anodes supplied from the positive line W—4 via a circuit breaker CB—4. Negative bias is supplied to the grids of the gas triodes G—6, G—7, G—8, G—9, G—10, G—11, G—12, and G—13 by a battery EC—1 having its positive terminal connected to the negative line W—3 of the direct current source, and the grid of triode G—14 is biased by a battery EC—3 and the grid of G—15 by a battery EC—2, these batteries being connected respectively through the resistors R—36 and R—35 to the negative line W—3.

A circuit breaker CB—5 is also connected with line W—4 to the relay contacts RL—3a and RL—4a to supply the terminals LP, LS, and EQ. A timing chart for the various circuit breakers is shown in Fig. 9. It is to be noted that the brushes 58 and 59 make one complete revolution of the selector disc SD at the end of each cycle, and with respect to Fig. 9, this must occur when the circuit breaker CB—4 is closed.

Associated with the contact roll CRP are a group of sensing brushes 64 each connected to a plub hub P6, P7, P8, or P9, and with contact roll CRS a group of brushes 65 each connected to a hub S6, S7, S8, or S9. Perforated record cards are fed between the brushes 64 and contact roll CRP and between the brushes 65 and contact roll CRS by card feed means (not shown) similar to that shown in Fig. 3b of U. S. Patent 2,359,670. Cards are fed in synchronism to each of the contact rolls so that corresponding card index positions arrive under the brushes 64 and 65 in time relation with the making of the CB—1 contacts. A circuit breaker PRI—1 operates with the card feed feeding a card to the contact roll CRP to energize a relay coil RL—1, and a circuit breaker SEC—1 operates with the card feed feeding a card to the contact roll CRS to energize a relay coil RL—2. The timing of PRI—1 and SEC—1 is also shown in the timing chart of Fig. 9; it is to be noted, however, that these circuit breakers operate only when their respective card feeds operate while the other circuit breakers (CB—1 to CB—5) are operating continuously.

The storage unit, previously discussed, is shown partially (see dotted lines of Fig. 8), a partial development of the cylinder 15 being shown, together with some of the condensers 18 and their contact segments 19 in each of the combined units (shown as 15a for column #1 and as 15b for column #2). Each cylinder 15 is arranged to revolve so that a group of segments 19 arrives under the brush station formed by the brushes 41, 42, 43 (or the brushes 49, 50, 51) during each time the contacts of circuit breaker CB—2 are made.

It is to be noted therefore that a record card is fed during the first 180 degrees of the operation cycle, that each storage unit cylinder makes two complete revolutions each operation cycle, and that the selector brushes make one complete revolution during the second half of each operation cycle.

In order to more clearly understand the utility of the invention as embodied in the circuit of Fig. 8, let it be assumed that plug wires are connected:

(a) From hub U—1 to hub P—6
(b) From hub U—2 to hub S—6
(c) From hub U—3 to hub P—7
(d) From hub U—4 to hub S—7

Also let it be assumed that record cards are fed to the contact rolls CRP and CRS, the cards each containing perforations representing data in two of the card columns, respectively sensed by the brushes 64 connected to hubs P6 and P7 and by the brushes 65 connected to hubs S6 and S7. The cards are fed with their highest numerical designation leading. Let it be further assumed that perforations sensed by the brushes connected to P6 and S6 represent the tens order and those sensed by the brushes connected to P7 and S7 the units order, i. e. corresponding respectively to column #1 and column #2 (Fig. 8).

Assume the card fed to CRP is perforated to represent a numerical value of 27, i. e. perforated at the "2" index position in the tens column and at the "7" index position in the units column, and the card fed to CRS is perforated to represent a numerical value of 22 in a similar manner. The record cards being fed with perforations representing the highest values leading, the first designation sensed is at the "7" index position of the card being fed over contact roll CRP, which places a positive charge on the grid of G—8 via line W—4, CB—1, brush 54, contact roll CRP, brush 64 leading to plug hub P7, plug wire to plug hub U—3, resistor R—25, contact RL—1b (transferred since RL—1 is energized due to PRI—1 contacts being made whenever the card feed to CRP operates). G—8 therefore becomes conductive, and a circuit is completed from W—4, via CB—2, anode of G—8, cathode of G—8, R—23, line W—3a, to line W—3, and a voltage drop is produced in resistor R—23. As the cylinder 15b pertaining to the storage unit associated with G—8 is revolving a condenser 18 will be charged when its segments 19 pass under the brushes 49 and 50 due to the voltage drop in R—23. The companion condenser 18 having its segments 19 under the brushes 50 and 51 will not be charged at this time since there is no voltage drop in the resistor R—24, G—9 not being conductive.

The card fed to CRP is fed simultaneously with the card fed to CRS, so that when the cards advance to have their "2" index positions under the brushes 64 and 65 respectively, positive pulses are supplied to the grids of G—6, G—7 and G—9 in a manner similar to that already described. With respect to G—9, when a positive pulse is supplied, G—9 becomes conductive and a circuit is established from W—4, via CB—2, anode of G—9, cathode of G—9, resistor R—24, W—3a, to W—3, and a voltage drop is produced in resistor R—24. Hence a condenser 18 of cylinder 15b whose segments 19 fall under the brushes 50 and 51 will be charged by the voltage drop in resistor R—24 at this time.

Since the cylinder 15b is revolving, it is obvious that the condenser 18 charged by resistor R—23 and its uncharged companion condenser will advance so that their segments 19 pass under the brushes 52 and 53 before the segments 19 associated with the condenser 18 charged by R—24. Consequently, due to the discharge of the condenser 18 through the circuit brush 52, resistor R—31, resistor R—30, brush 53, a voltage drop will be produced in resistor R—31 to swing the grid of G—12 positive causing G—12 to conduct. A current will thereby flow from W—4, via CB—3, line W—7, anode of G—12, cathode of G—12, resistor R—27, resistor R—29, to line W—3. The voltage drop in the resistor R—29, thereby produced, will bias the grids of G—12 and G—13 sufficiently to prevent a charge of another charged condenser 18 from rendering either G—12 or G—13 conductive. Unlike CB—2, which is timed to break its contacts between each passage of a group of segments 19 under the brushes 49, 50, 51, the circuit breaker CB—3 retains its contacts closed continuously for 270 degrees of the operation cycle (see Fig. 9). G—12 therefore remains conductive, but G—13 remains non-conductive and is unaffected by the passing under the brushes 52 and 53 of the segments 19 associated with the condenser 18 charged by resistor R—24.

With respect to G—6 and G—7, each receives a positive pulse upon its grid simultaneously, each thereby being rendered conductive at the same time, and both condensers 18 of a pair consequently being charged simultaneously when their segments 19 pass under the brushes 41, 42, 43. Therefore when the cylinder 15a revolves and the condensers 18 have their segments 19 pass under the brushes 44 and 45, no potential difference is provided across resistors R—19 and R—20 so that neither G—10 nor G—11 becomes conductive. Since neither G—10 nor G—11 is conductive there will be zero voltage drop across the respective resistors R—16, R—17, and R—29, and the potentials of the cathodes of G—10 and G—11 with respect to line W—3 will be zero. On the other hand the potential of the cathode of G—12 with respect to W—3 will be the sum of the voltage drops in resistors R—27 and R—29 while the cathode potential of G—13 will be equal to the voltage drop of resistor R—29.

When the brushes 58 and 59 sweep over the selector disc SD during the second half of each operation cycle encountering the inserts 60 and 61 no change of potential occurs at the grids of G—14 or G—15. When the brush 58 contacts the insert 62 a positive potential equivalent to the voltage drop of resistor R—29 is applied to the grid of G—14; however, the bias battery EC—3 is sufficient to prevent the triode G—14 from becoming conductive. When brush 59 encounters the insert 63, however, a positive potential equivalent to the sum of the voltage drops across R—27 and R—29 is applied to the grid of G—15 sufficient to overcome the negative bias of the battery EC—2 and render G—15 conductive. The relay RL—3 is thereby energized via a circuit line W—4, CB—4, anode of G—15, cathode of G—15, relay RL—3, resistor R—34, to line W—3. The relay contacts RL—3a are thereby transferred so that when the circuit breaker CB—5 closes its contacts a voltage pulse will be transmitted from the line W—3 to the plug hub LS which is plugged to control the feeding of cards from the contact roll CRS ahead of cards from contact roll CRP similar to a machine such as that described in U. S. Patent 2,359,670. In other words, control is provided in accordance with the order or sequence of the record cards that are sensed and compared. With the arrangement shown in Fig. 8 if a higher order card were sensed at CRS than at CRP, a similar operation would be effected to operate the relay RL—4 and its contacts RL—4a (transferred) to deliver a pulse via the plug hub LP. When the cards sensed at CRP and CRS are the same order, or when cards are not sensed at both CRP and CRS, no pulse is received by either G—14 or G—15 so that a pulse is delivered via the circuit breaker CB—5 and the normally closed contacts RL—3a and RL—4a to the plug hub EQ. It is to be further noted that when either G—14 or G—15 is conductive, the voltage drop in resistor R—34 is added to the negative bias of the battery EC—2 or EC—3 to prevent the other gas triode from responding to a pulse which might be derived from the brushes 58 or 59 contacting inserts 67 or 68, respectively, the latter being at positive potentials resulting from the sensing of data in columns of the record cards representative of lower digital significance when control has already been established by a higher digital significance.

When cards are fed to and sensed at CRP and are not fed to and sensed at CRS, or vice versa, the designation of the last card so fed and sensed will prevail in the storage unit involved until further cards are fed and sensed. For example, let it be assumed that a card having a numerical designation "35" is fed to CRS and thereafter no cards are fed to CRS although cards continuously are fed each cycle to CRP. When the card is sensed by CRS the tube G—7 will become conductive as the "3" index position is sensed and the tube G—9 as the "5" index position is sensed. Consequently a condenser 18 in the cylinder 15a of the associated storage unit will be charged as the cylinder rotates to bring segments 19 under the brushes 42 and 43 via the voltage drop in resistor R—13 (in a manner similar to that previously described). Since the charged condenser 18 advances as the cylinder 15a revolves, the charge on the condenser will be sensed by the comparing brushes 44 and 45 to actuate the tube G—11 so that comparing is made with pulses supplied to G—10, as previously described. While cards continue to be fed the circuit breakers PRI—1 and SEC—1 operate as shown in the timing chart (Fig. 9). When no card is fed over CRS, however, its feed clutch is not engaged at 234 degrees (see Fig. 9); consequently, the contacts of SEC—1 remain open. Therefore the relay RL—2 remains de-energized and the contacts RL—2a and RL—2b do not transfer.

It is to be noted here that when a charged condenser 18 is sensed by the brushes 44 and 45 (or by the brushes 52 and 53), in order to provide potentials for energizing G—10 and G—11 (or G—12 and G—13) to conduct, a portion of the charge is drained off via the current in the resistors R—19 and R—20 (or R—30 and R—31). Also when one condenser of a pair of condensers 18 is uncharged and the other charged, as their segments 19 contact the brushes 44 and 45, a current through resistors R—19 and R—20 will flow from the charged condenser 18 tending to charge the uncharged condenser of the pair (similarly regarding brushes 52 and 53 relative to resistors R—30 and R—31). Since the resistors R—19 and R—20 (or R—30 and R—31) are selected to have a value of 100,000 ohms or more, and the brushes 44 and 45 (or 52 and 53) contact the segments 19 for a relatively short interval, the drain from the charged condenser 18 will be negligible and the extent to which the uncharged condenser of a pair of condensers 18 is charged will be very slight. Consequently the extent to which a charged condenser 18 is discharged in this manner is immaterial.

Therefore after a charged condenser 18 passes its segments 19 under the brushes 44 and 45, its charge is substantially unaffected, and if the contacts RL—2a remain in their normal position (which is the case when the circuit breaker SEC—1 is open) a charge will be sensed by the brushes 39 and 40 as the cylinder 15a continues revolving sufficient to render the tube G—7 conductive. Consequently the condenser 18 which renders G—7 conductive will in turn be recharged by the voltage drop of R—13 produced by G—7 when the condenser segments 19 pass under the brushes 42 and 43. In this manner the condenser will be recharged every cycle until a new card is fed to CRS when the contacts RL—2a transfer. A similar action follows with a condenser 18 in the cylinder 15b with respect to the contacts RL—2b and the brushes 47, 48, 50, and 51 and the gas triode G—9. When no cards are fed to CRP similar action takes place.

When cards are fed continuously to CRP or CRS any charge remaining on any condenser 18 is removed by leaking off over one of the resistors R—12, R—13, R—23, or R—24 (since the contacts RL—1a, RL—1b, RL—2a, and RL—2b are transferred) unless a designation is sensed at CRP or CRS which would produce an identical charge with that already on the condenser.

Since the values of some of the electrical components are somewhat critical, as heretofore noted, a list of values which may be used is hereinafter tabulated:

G—1 to G—15: Type 884 (RCA) gas triode
Condenser 18: .1 mfd.
EC—1: 25 volts D. C.
EC—2, EC—3: 80 volts D. C.
Line W—3 to line W—4: 115 volts D. C.
R—7, R—8, R—16, R—17, R—27, R—28: 500 ohms
R—2, R—9, R—18, R—29, R—34: 1000 ohms
R—1, R—12, R—13, R—23, R—24: 1500 ohms
R—3, R—4, R—10, R—11, R—14, R—15, R—19, R—20, R—21, R—22, R—25, R—26, R—30, R—31, R—32, R—33, R—35, R—36: 50,000 ohms While there have been shown and described and pointed out the fundamental novel features of the invention as applied to a preferred embodiment it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record controlled machine wherein record cards are fed having data representations at index point positions, means for sensing successively the said positions, a series of capacitors including one capacitor for each said position, a normally effective capacitor discharging means capable of dissipating an inherent charge on any of said capacitors, a normally ineffective capacitor charging means capable of charging a said capacitor to a predetermined value, means for moving said capacitors successively into operative relation with the said discharging means and with the said charging means concurrently with the sensing of the respective positions of a record card, and means controlled by the sensing means for rendering the said charging means effective and simultaneously rendering the said discharging means ineffective when a data representation is sensed.

2. In a record controlled machine wherein record cards are fed having data representations at index point positions, means for sensing successively the said positions, a series of capacitors including one capacitor for each said position, an impedance, means for connecting said capacitors successively across said impedance concurrently with the sensing of the respective positions of a record card normally whereby a residual charge upon a capacitor leaks off, and means controlled by the sensing means for developing a potential across said impedance when a data representation is sensed effective to charge the capacitor then connected across the said impedance.

3. In a record controlled machine for storing representations of record card data, means for successively sensing the index point positions of a record card, an electronic device rendered conductive responsive to the sensing of a data representation at one of the said positions, a plurality of capacitors one corresponding to each said position, circuit connections to the said device for deriving a potential therefrom when said device is conductive, distributing means coacting with the said connections for selectively charging a said capacitor, means for reading successively each of the said capacitors to detect a charge, and means for disconnecting the said electronic device from the said sensing means and for connecting the said detecting means thereto whereby a charged capacitor renders the said device conductive to recharge the said capacitor.

4. In a record controlled machine wherein record cards are fed having data representations at index point positions, means for sensing successively the said positions, a series of capacitors including one capacitor for each said position, a normally ineffective capacitor charging means capable of charging a said capacitor to a predetermined value, means for moving the said capacitors successively into operative relation with the said charging means concurrently with the sensing of the respective positions of a record card, means controlled by the sensing means for rendering the said charging means effective when a data representation is sensed, means for detecting a charge upon a said capacitor, means for transferring control of the said charging means from the said sensing means to the said detecting means for rendering the charging means effective when a charge upon a said capacitor is detected, and delay means for continuing the said charging means effective for a predetermined time.

5. In a comparing device for control records having data representations at index point positions, a plurality of pairs of capacitors, one pair corresponding to each said position, means for sensing concurrently like positions in two of said records, said means being arranged to sense the different positions in each record sequentially, means under control of the said sensing means for charging a related capacitor each time a data representation is sensed, means for detecting charges upon the pairs of capacitors sequentially each cycle, a pair of control devices, and means controlled by the said detecting means upon detecting the first charged capacitor of a pair in a cycle, for selectively operating one of the said control devices.

6. In a comparing device for control records having data representations at index point positions, a plurality of pairs of condensers, one pair corresponding to each said position, means to sense corresponding index point positions of two records simultaneously, the said means being adapted to sense the different positions in each record in sequence, means under control of the said sensing means for charging a related condenser each time a data representation is sensed, cylindrically operative means for detecting charges upon the pairs of condensers successively each cycle, a pair of control devices, and means controlled by the said detecting means for operating one or the other of the said control devices according to the disparity of charge detected between a pair of condensers.

7. In a comparing device for comparing two data representing means, means for sensing concurrently the two said data representing means, said sensing means sensing both data representing means sequentially over a predetermined number of different data values, two series of capacitors, each series including one capacitor for each of the said values, two normally ineffective capacitor charging means, one for each series of capacitors, means to bring the capacitors of both series pertaining to each said value into operative relation with their related charging means coincident with the sensing of said data representing means for the respective data values, means controlled by the said sensing means upon the detection of a value in either of the said data representing means for rendering the related charging means effective, means for comparing the respective charges on pairs of corresponding capacitors in the two series pertaining to each said value, and a pair of normally inoperative control devices selectively operable by the said comparing means according to the disparity of the compared charges.

8. A device for comparing the respective charges upon a pair of series connected capacitors comprising a pair of gaseous discharge devices having their cathodes connected in common and a terminal connection to a control element of each adapted to be detachably connected to one of the free terminals of the said capacitor pair, a load circuit for each said device connected between its anode and the common cathode connection, and an impedance connected between the said control elements having a center tap connected to the said common cathode connection, whereby a disparity in the charges upon the capacitors being compared produces a potential in the said impedance to cause load current to flow in one of the said devices and to prevent load current from flowing in the other.

FRED C. HALLDEN.

REFERENCES CITED

The following references are of record in the file of this patent:

UNITED STATES PATENTS

| Number | Name | Date |
| --- | --- | --- |
| 2,220,489 | Lowkrantz | Nov. 5, 1940 |
| 2,349,437 | Keeler | May 23, 1944 |
| 2,416,625 | Hooper | Feb. 25, 1947 |

OTHER REFERENCES

Dual-Triode Trigger Circuits, Phelps, Electronics, page 110, Fig. 1, July 1945.

Certificate of Correction

Patent No. 2,514,054

July 4, 1950

FRED C. HALLDEN

It is hereby certified that error appears in the printed specification of the above numbered patent requiring correction as follows:

Column 13, line 33, for the word "cylindrically" read *cyclically*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*